United States Patent [19]
McBride et al.

[11] Patent Number: 5,721,615
[45] Date of Patent: Feb. 24, 1998

[54] SENSOR SYSTEM FOR MEASUREMENT OF TEMPERATURE OR STRAIN

[75] Inventors: Roy McBride, Edinburgh; James G. Burnett; Alan Howard Greenaway, both of Malvern; Julian D. C. Jones, Edinburgh, all of United Kingdom

[73] Assignee: The Secretary of State for Defense in Her Britannic Majesty's Government of the United Kingdom of Great Britain and Northern Ireland, Hampshire, United Kingdom

[21] Appl. No.: 591,475

[22] PCT Filed: Jun. 27, 1994

[86] PCT No.: PCT/GB94/01388

§ 371 Date: Jan. 25, 1996

§ 102(e) Date: Jan. 25, 1996

[87] PCT Pub. No.: WO95/02802

PCT Pub. Date: Jan. 26, 1995

[30] Foreign Application Priority Data

Jul. 12, 1993 [GB] United Kingdom ............ 9314487

[51] Int. Cl.$^6$ ..................................... G01B 9/02
[52] U.S. Cl. .......................................... 356/345
[58] Field of Search ..................... 356/345, 35.5, 356/361; 250/227.19, 227.27; 385/12, 14

[56] References Cited

U.S. PATENT DOCUMENTS 4,755,668 7/1988 Davis ..................... 356/345
4,859,844 8/1989 Herman et al. ......... 356/345

OTHER PUBLICATIONS

Simultaneous Thickness and Group Index Measurements Using Optical Low–Coherence Reflectometry, Sorin et al, IEEE Photonics Tech. Letters, 1–1992, pp. 105–107.

Primary Examiner—Samuel A. Turner
Attorney, Agent, or Firm—Nixon & Vanderhye P.C.

[57] ABSTRACT

A sensor system in an interferometric arrangement has a sensor arm and a reference arm. The reference arm is in a stable environment and the sensor arm is arranged to be subject to variations in strain and/or temperature. Radiation from a broadband source propagates through the arrangement and a broadband interferogram is generated as an air gap is scanned. The interferogram is recorded on an oscilloscope and analyzed using signal processing software on a computer. From the analysis the changes in group delay and optical dispersion of the light in the sensor arm due to strain and temperature changes is measured, and values for the strain and/or temperature changes calculated. A narrowband light source may be used for accurate calibration of path length differences during scanning. The strain and temperature on the sensor arm may be calibrated or tested using clamps and a thermal enclosure. The system may also be configured in a tandem interferometry arrangement including a sensing interferometer and reference interferometer.

24 Claims, 4 Drawing Sheets

SENSOR SYSTEM FOR MEASUREMENT OF TEMPERATURE OR STRAIN

BACKGROUND OF THE INVENTION

1. Field of the Invention

This invention relates to a sensor system for making measurements of strain and/or temperature.

2. Discussion of Prior Art

Optical fibre sensors are known in the prior art. They employ optical fibres to guide light which becomes modulated in response to external influences such as changes in temperature or strain in an environment in which the fibre is situated. Optical fibres are used as arms of interferometers such as Mach-Zehnder interferometers. In such interferometers a measurand, such as strain or temperature experienced by a fibre arm, causes changes in optical path length or polarization properties of the fibre. This in turn causes changes in an observed fringe system from the interferometer. By analysing the fringe changes, information about the measurands causing the changes can be inferred. The visibility of the interference fringes is determined partly by the coherence of the light through the interferometer system. Because of this monomode optical fibres, which maintain the spatial coherence of a guided light beam, are preferred for use in interferometers as multimode optical fibres do not maintain the spatial coherence of a guided beam.

Interferometric devices are known in which light from a source is divided to form two light beams which are input to two monomode optical fibres. One optical fibre forms a sensor which experiences the measurand and the other optical fibre forms a reference. The reference is situated in a stable environment. The two light beams pass through the respective fibres and are recombined on emergence to form a fringe system. The phase difference between the optical paths travelled by the light beams through the sensor and reference fibres can be inferred from observed output fringe intensities. The phase sensitivity of interferometers to physical influences such as temperature and strain is particularly high, which makes interferometer systems useful for sensing applications.

It is a disadvantage of optical fibre sensors that they are sensitive to all physical influences on the fibre. The sensor output therefore corresponds to a convolution of a number of physical effects. Consequently, when measuring a single parameter such as strain on the sensor, the output from an interferometer also includes the effects of other environmental factors such as temperature. Because of this cross-sensitivity between parameters it is necessary to isolate the parameter being measured. Measurements of strain are therefore made in a temperature-controlled environment, and temperature measurements in a constant-strain environment.

F Farahi et al ("Simultaneous Measurement of Temperature and Strain: Cross-Sensitivity Considerations", Journal of Lightwave Technology 8(2): 138–142, February 1990) considered discrimination between strain and temperature by measuring phases at the combined output of a polarimetric and interferometric fibre device for two polarisation modes of an optical fibre sensor. However, discrimination between strain and temperature was found to be poor because the ratio of strain-dependence to temperature-dependence of optical effects on light passing through an optical fibre is similar for each polarization mode.

Discrimination between temperature and strain measurements has been achieved by A M Vengsarkar et al. ("Fibre Optic Sensor for Simultaneous measurement of Strain and Temperature", Vol. 1367 of Proc. SPIE "Fibre Optics and Laser Sensors VIII (1990)", pages 249–260). The system used is a dual technique involving the use of a dual-mode elliptical core optical fibre and light beams of two different wavelengths. One of these light wavelengths $\lambda_1$ is below the single-mode cut-off wavelength $\lambda_c$ of the fibre and the other light wavelength $\lambda_2$ is above it. A polarimetric technique is used for sensing with light of wavelength $\lambda_1$ and a two-mode technique used for light of wavelength $\lambda_2$. The two-mode technique relies on interference between the modes. The effects of strain and temperature on the light as it passes through the optical fibre sensor are different at the two different wavelengths; consequently the contributions of strain and temperature to the optical fibre sensor output can be deconvoluted from an analysis of the two separate results from the output of the interferometer at the two wavelengths. This system has the disadvantage that the discrimination between strain and temperature is poor, as the ratio of strain dependence of the fibre optical properties to their temperature dependence is similar for both wavelengths of light. This causes difficulty in separating the effects of strain and temperature experienced by the optical fibre sensor.

A further disadvantage of sensors based on the effects of measurands on the polarization of light in optical fibre sensors is that the polarization is relatively insensitive to environmental changes. Consequently devices based on polarization changes are less sensitive than interferometric devices.

A twin-core optical fibre sensor for the simultaneous measurement of strain and temperature was described by Dunphy and Meltz ("Optical Fibre Sensor Development for Turbine Applications", AIAA-89-2914 25th Joint Propulsion Conference, page 3156 et seq.). This device comprises a fibre with two closely-spaced matched cores. Propagation in the cores is limited to two fundamental modes, a symmetric twin-core mode and an asymmetric counterpart. The propagation constants of the modes are slightly different and because of this there is periodic interference along the fibre. This causes the light to switch completely from one core to the other during propagation. The length of fibre over which the optical power switching, or crosstalk, takes place is termed the beat length. External influences such as temperature or strain change the length of the fibre and also the beat length, causing a phase shift between the two modes. The relative phase shift between the modes is dependent upon the wavelength of light used, and the temperature and strain experienced by the sensor. By calibrating the device sensitivities to strain and temperature, the simultaneous operation of the device at two different wavelengths enables the temperature and strain experienced by the sensor to be calculated. However, this device has the disadvantage that it requires a sensor formed from twin-core optical fibre, which is non-standard and consequently expensive. The device in the paper of Dunphy and Meltz also suffers from phase ambiguity during operation over temperature ranges greater than the dynamic range of the device.

A further prior art device for measurement of temperature and strain is disclosed in European Patent Application No 0 564 034. It discloses an interferometer in which monochromatic light beams passing through fibre optics are employed to produce interferograms from which temperature and strain can be determined.

SUMMARY OF THE INVENTION

It is an object of the invention to provide an alternative sensor system having improved discrimination between strain and temperature effects.

The present invention provides a sensor system incorporating an interferometer device incorporating:

(a) a reference arm,
(b) a sensor arm having optical group delay and optical dispersion responsive to temperature and strain therein,
(e) a source of radiation,
(d) means for coupling radiation from the source to each of the interferometer arms,
(e) delaying means arranged to introduce a variable temporal delay in the path of radiation in one of the interferometer arms relative to that in the other,
(d) combining means arranged to receive radiation contributions from the interferometer arms and to combine them to produce a radiation interferogram,
(e) detecting means for detecting the interferogram, and
(f) processing means arranged to derive at least one of the temperature and strain associated with the sensor arm from the optical delay and optical dispersion associated with that arm, characterised in that:
(g) the source is a source of broadband radiation,
(h) the combining means is arranged to produce a broadband radiation interferogram,
(i) the detecting means is arranged to detect the broadband interferogram variation as a function of varying temporal delay, and
(j) the processing means is arranged to transform the interferogram variation and to derive thereby at least one of the temperature and strain associated with the sensor arm from the optical group delay and optical dispersion associated with that arm.

The system of the invention obtains temperature and strain from optical group delay and optical dispersion, and in consequence the contributions of strain and temperature are separated. The invention provides the advantage that simultaneous measurements of temperature and strain can be made, with low strain-temperature cross-sensitivity. Alternatively, one of strain and temperature may be measured despite variation in the other.

The invention may include a calibration and test unit for establishing the temperature and strain on a sensor arm in an initial state or for carrying out checks on the operation of the sensor system.

The invention may include a tandem interferometry system in which one interferometer performs a sensing function and the other interferometer performs a reference function. Several measurements of strain and temperature can then be made using a number of sensing elements on a single length of optical fibre. This enables a number of measurements to be made using the same optical fibre length and has use in applications such as advanced aerospace materials.

The processing means preferably includes means for removing $2\pi$ discontinuities from an interferogram. This embodiment provides the advantage that the absolute relative phase is not lost when the system is itched off; and the phase does not have to be continuously monitored between measurements, when the system is operated over a range where the induced phase change exceeds $2\pi$.

In systems incorporating a monochromatic light source the intensity at the output of an interferometer is periodic with phase and consequently output readings differing in phase by $2\pi$ are indistinguishable. Interferometers are sufficiently sensitive to physical influences that phase changes greater than $27\pi$ are possible.

BRIEF DESCRIPTION OF THE DRAWINGS

In order that the invention might be more fully understood, embodiments thereof will now be described by way of example only, with reference to the accompanying drawings, in which.

DETAILED DISCUSSION OF PREFERRED EMBODIMENT

Figure 1:
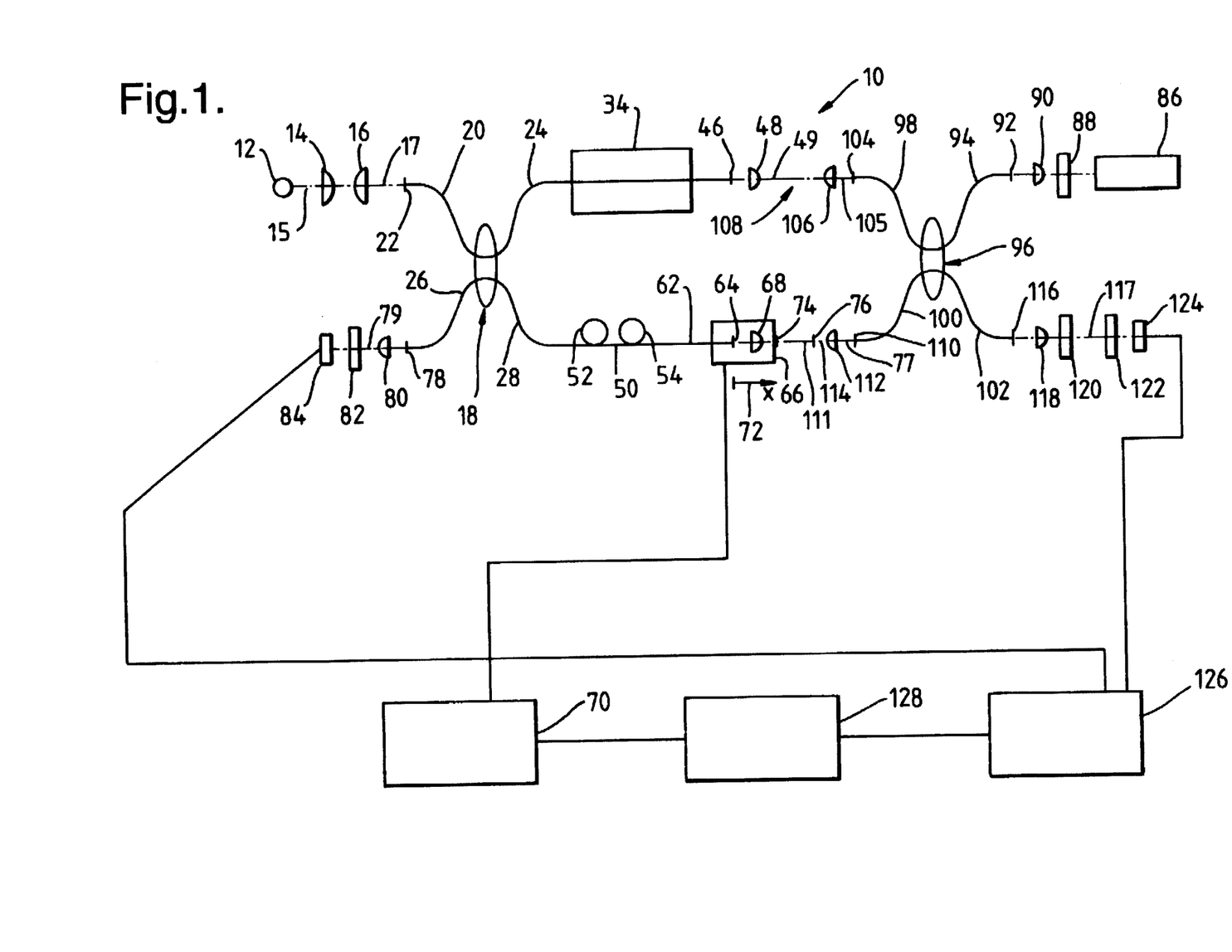
FIG. 1 is a schematic view of a sensor system of the invention.

Referring to FIG. 1, there is shown a schematic view of a sensor system for measuring strain and temperature in accordance with the invention, the sensor system being indicated generally by 10. A xenon arc lamp 12 emits visible radiation with a broad bandwidth. The lamp 12 has a power rating of 150W. A first lens 14 with diameter 38 mm and focal length of 35 mm is situated 35 mm from the lamp 12. The lens 14 has an optical axis 15 aligned with the lamp 12 to maximise the coupling of light into the system. A second lens 16 with focal length 75 mm is located 80 mm from lens 14; it is situated such that its optical axis 17 is coincident with the optical axis 15 of lens 14. A directional coupler 18 has a light input arm 20. The input arm 20 has an end 22 which is situated on the optical axis 17 of lens 16 and situated 75 mm from the lens 16. The directional coupler 18 has four arms: the light input arm 20, a sensor arm 24, a detection arm 26 and a reference arm 28. The directional coupler 18 is available from commercial sources and comprises two lengths 20/24 and 26/28 of circular core optical fibre balanced to have the same length to within 10 µm. Each optical fibre has a 4 µm diameter core and a 125 µm diameter cladding. The cladding is made from silica. The core is silica with 4% germania doping, and the fibre has a cut-off wavelength of 610 nm. The optical fibre is arranged for monomode propagation of radiation. Light propagated down one fibre is coupled into the other fibre. The directional coupler 18 is arranged to have substantially 50% coupling between the fibres 20/24 and 26/28 for light of wavelength 633 nm.

Figure 2:
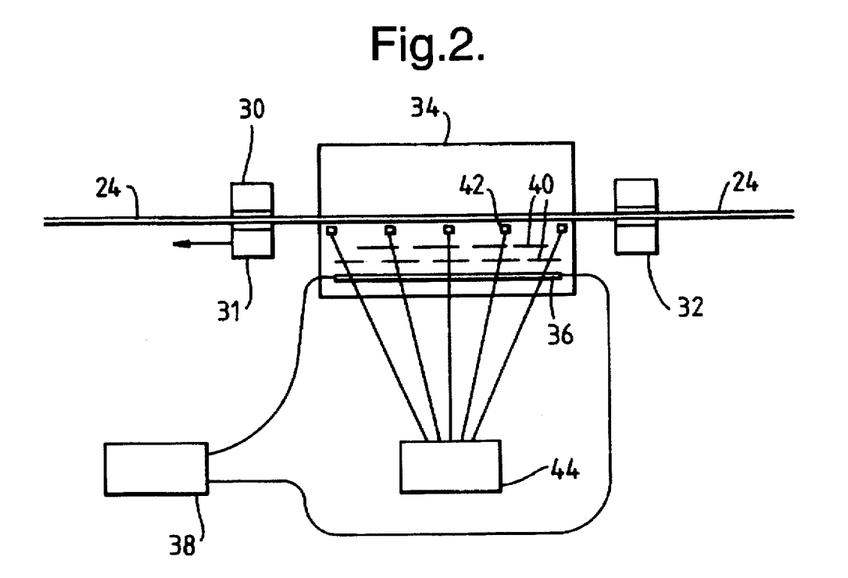
FIG. 2 is a schematic view of a calibration unit for use with the device of FIG. 1.

Referring now also to FIG. 2, the sensor arm 24 extends between two sets of clamps 30 and 32. The clamp 30 has a micrometer-driven translation stage 31. The clamps are separated by a distance of 887 mm. An 800 mm long section of sensor arm 24 between the clamps 30 and 32 is located in a thermally insulated enclosure 34, which forms a temperature-controlled environment. The enclosure 34 contains a resistive heating element 36 which is connected to a 30V power supply unit 38, capable of supplying a 2A current. A series of baffles 40 is located inside the enclosure 34 between the sensor arm 24 and the heating element 36. A series of thermocouples 42 is located inside the enclosure 34 between the baffles 40 and the sensor arm 24. The thermocouples 42 are equally spaced within the enclosure 34 along the length of the sensor arm 24. The thermocouples 42 have a linear response with temperature and are capable of making readings which are repeatable to within 0.5°. Each of the thermocouples 42 is connected to a digital thermometer 44 for monitoring the air temperature in the thermal enclosure 34 in the region of the sensor arm 24. Referring again to FIG. 1, the end 46 of the optical fibre forming the sensor arm 24 is located in the focal plane of a lens 48. The lens 48 is a ×10 microscope objective lens, and the end 46 of sensor arm 24 is located on an optical axis 49 of the lens 48.

The reference arm 28 of the directional coupler 18 is connected to a polarization controller 50. The polarization controller 50 is shown in more detail in FIG. 3. The design of the polarization controller 50 is in accordance with the design criteria described by H C Lefevre ("Single Mode Fibre Fractional Wave Devices and Polarization Controller", Electronics Letters, 25 Sep. 1980, Vol. 16. No. 30, p. 778–780). The polarization controller includes a length of optical fibre of the same type as that used for the directional coupler 18, that is, 4 μm core diameter and 125 μm diameter cladding, with a 4% germania-doped silica core. The fibre forms two loops 52 and 54 around respective supports 56 and 58, the diameter of the supports 56 and 58 being 42 mm. Each support 56 and 58 is separately rotatable about an axis 60.

Figure 3:
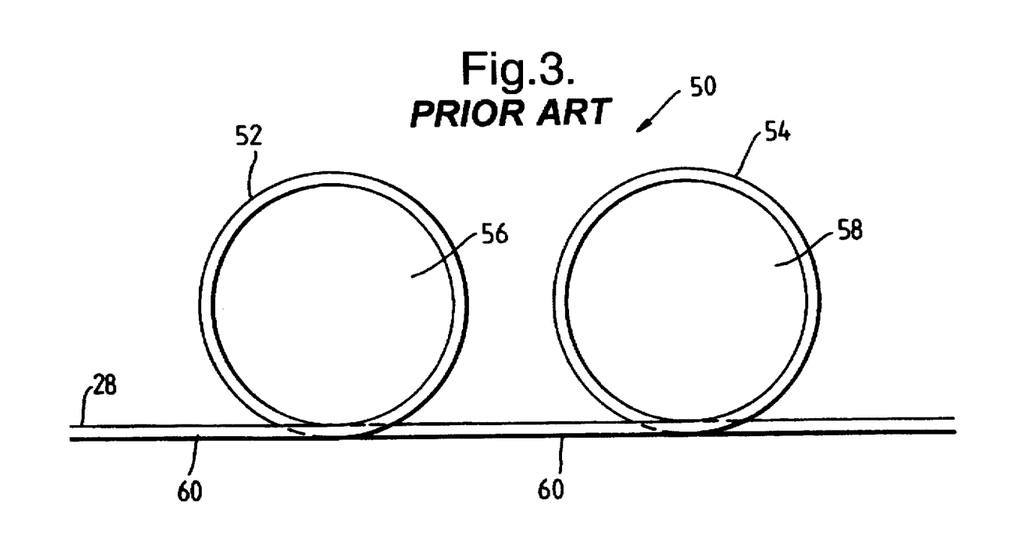
FIG. 3 is a schematic view of a polarisation controller for use in the device of FIG. 1.

Each of the loops 52 and 54 has the effect of a quarter-wave plate. By adjusting the relative orientation of the supports 56 and 58 abut the axis 60 the polarization state of the light in the output section of the reference arm 100 is matched to the polarization state of the light at the output section of the sensor arm 98 where the two modes recombine at the directional coupler 96. The visibility of the observed interferogram can thus be maximised.

A length of optical fibre 62, with end 64, extends from the polarization controller 50. The and 64 is mounted on a translation stage 66 at the focal point of a lens 68. The lens 68 is a ×10 microscope objective lens and the fibre end 64 is situated on the optical axis of the lens 68. The translation stage 66 has a D.C motor which is controlled by a D.C. motor controller. The translation stage 66 is capable of movement at a rate of 160 μm per second, and movement over a distance of 300 μm. The translation stage moves in both positive and negative X-directions, as defined by axis 72, between extreme positions 74 and 76 which are 300 μm apart. The axis 72 is co-linear with an optical axis defined by fibre ends 64 and 110 and lenses 68 and 112. The translation stage 66 is capable of motion as previously described. The fibre end 64 and lens 68, which are mounted on the translation stage 66, are capable of like motion.

The detector arm 26 of directional coupler 18 has an end 78 located along an optical axis of lens 80 and situated in the focal plane of the lens 80. The lens 80 is a ×20 microscope objective lens. A bandpass filter 82 is located a distance 50 mm from the lens 80. The bandpass filter 82 passes light in a 11 nm bandwidth centred at a wavelength of 632.8 nm. A light detector 84 is situated at a second focal plane of the lens 80. The detector 84 is a silicon PIN photodiode which has an active area of 1 mm$^2$, and is centred on the optical axis of lens 80.

A helium-neon laser 86 is arranged to emit linearly polarised radiation of wavelength 632.8 nm in a beam towards an optical attenuator 88. The optical attenuator 88 is a rotatable linear polarizer. A lens 90 is situated a distance 50 mm from the attenuator 88. The lens 90 is a ×20 microscope objective lens. Art end 92 of an optical fibre input arm 94 of a directional coupler indicated generally by 96 is situated on the optical axis of lens 90 and at its focal point. The directional coupler 96 is identical to the directional coupler 18 previously described. The directional coupler 96 has four optical fibre arms; these are an input arm 94, a sensor arm 98, a reference arm 100 and a detector arm 102. The sensor arm 98 has an end 104 located on an optical axis 105 of a lens 106 and at its focal point. The lens 106 is a ×20 microscope objective lens. The optical axes of the lenses 106 and 48 are co-incident, and they are separated by an air gap 108 of length 162 mm.

The reference arm 100 has an end 110, situated at a focal point of a lens 112. End 110 is located on an optical axis 111 of lens 112. The lens 112 is a ×20 microscope objective lens. The optical axis 111 of the lens 112 and the lens 68 are co-incident. The lens 112 and the lens 68 are separated by an air gap 114. The air gap 114 is of length 163 mm when the lens 68 is at its farthest extreme position from lens 112 and the translation stage 66 is at the extreme position 74.

The detector arm 102 has an end 116, which is at a focal point of a lens 118. End 116 is located on an optical axis 117 of lens 118. The lens 118 is a ×20 microscope objective lens. A linear polarizer 120 is situated a distance 70 mm from the lens 118. A spectral filter 122 is located a distance 30 mm from the polarizer 120. A detector 124 is situated at the second focal plane of lens 118. The detector 124 is a silicon PIN photodiode of active area 1 mm$^2$, and is centred on the optical axis of lens 118.

The output of detectors 84 and 124 is input to a digital storage oscilloscope 126. The oscilloscope 126 is an 8-bit device capable of 20 megasamples per second. A host computer 128 is connected to the oscilloscope 126 and the motor controller 70. Computer 128 is capable of reading signals from detectors 84 and 124 stored on the oscilloscope 126. The signals from oscilloscope 126 form the data input to signal processing software on the computer 128, the signal processing software being described later. The signal processing software performs the function of calculating the strain and temperature experienced by the sensor arm 24 from the output of detectors 84 and 124. Computer 128 is also connected to the motor controller 70, via an RS232 interface, and the computer 128 provides instructions to the motor controller 70 concerning the movement of the translation stage 66.

The operation of the sensor system will now be described in general terms, a more detailed theoretical analysis being given later. Broadband light from the arc lamp 12 is collimated by the lens 14 and focussed by the lens 16 onto the core of input arm 20 at its end 22. The light is propagated along the input arm 20 of directional coupler 18, and couples into the reference arm 28 and sensor arm 24 of directional coupler 18. Directional coupler 18 has a 50:50 split ratio at light wavelength of 632.8 nm and thus substantially half of the light power is coupled from input arm 20 to reference arm 28. A substantial part of the remainder of the light is propagated along sensor arm 24. The light propagates through the region of arm 24 between the clamps 30 and 32 and in the thermally-isolated enclosure 34. The light emerges from end 46 of the arm 24 and is collimated by lens 48. The light beam propagates across the air gap 108 and is focussed by the lens 106 onto the core of sensor arm 98 of the directional coupler 96, at its end 104.

The light coupled into the reference arm 28 propagates to the polarization controller 50. The light passes through the optical fibre of polarization controller 50 and emerges from the end 64 of optical fibre 62. The light from the end 64 is collimated by the lens 68. The light propagates across the variable air gap 114 to the lens 112, where it is focused onto the end 110 of the optical fibre reference arm 100.

The light beams propagating along sensor arm 98 and reference arm 100 combine at the directional coupler 96 to form two beams which propagate along arms 94 and 102. The light in arm 102 emerges at end 116 and passes through polarizer 120. Polarizer 120 selectively passes light due to one linear polarization mode. The light then passes through the spectral filter 122 which filters out light of undesired wavelengths. The broadband interferogram is then detected by the detector 124 as the translation stage 66 moves between extreme points 74 and 76.

An interferogram of the light from the helium-neon laser 86 is generated in the following manner, for the accurate calibration of path length changes in the interferometer. The helium-neon and broadband light beams travel in opposite directions through the interferometer. The helium-neon and broadband interferograms are generated and recorded simultaneously. Light from the helium-neon laser 86 passes through the optical attenuator 88. The optical attenuator 88 can be rotated to reduce the amount of light from the laser 86 reaching the detector 124 due to scattering on reflection from the elements of the system. The laser light is focused by the lens 90 on to the core at end 92 of light input arm 94 of the directional coupler 96. The light passes along arm 94 of the directional coupler which causes a 50:50 split of the light into the sensor arm 98 and the reference arm 100. The light propagated along sensor arm 98 emerges from the end 104, is collimated by lens 106 and propagates across the air gap 108. Lens 48 focusses the beam onto the end 46 of the sensor arm 24. The light is propagated along the sensor arm 24 through the region between clamps 30 and 32 and enclosure 34. The light in reference arm 100 emerges from end 110, is collimated by lens 112 and propagates across the air gap 114. The lens 68 focuses the light onto the end 64 of the optical fibre 62. The light propagates along the fibre 62 to the polarization controller 50. The polarization controller 50 enables the polarization state of the light to be adjusted so that the polarization states of the two beams travelling through the interferometer can be matched when recombined, thereby improving fringe visibility in the resulting interferogram.

The light from the polarization controller 50 propagates to the reference arm 28 of the directional coupler 18 where it is recombined with the light propagating along the sensor arm 24 to produce two new beams which propagate along arm 20 and detector arm 26. Recombined light emergent from the fibre end 78 passes through lens 80 and bandpass filter 82, which transmits an 11 nm bandwidth centred on 632.8 nm wavelength to the detector 84. The helium-neon interferogram is measured by the detector 84, which is monitored by the oscilloscope 126, as the translation stage 66 moves between extreme points 74 and 76.

The light from both the helium-neon and broadband interferograms are first recorded on the oscilloscope 126 in an initial reference state. The reference state is calibrated by measuring known strain and temperature conditions by means of the sensor arm 24. The strain is imposed using the micrometer-driven translation stage 31 of clamp 30; the temperature is determined by heating the element 36 using power supply unit 38, and measuring the temperature in the region of the sensor arm 24 within the thermally isolated enclosure 34 using the thermocouples 42. Measurements of the interferograms in the reference state are recorded on the oscilloscope 126 as the translation stage 66 is moved between extreme positions 74 and 76, changing the length of the air gap 114. In this manner the interferograms are generated as the air gap is scanned.

Once measurements of the helium-neon interferogram and the broadband interferogram have been made and the interferograms stored in the oscilloscope 126 the thermal enclosure 34 and clamps 30 and 32 are removed for measurements of strain and temperature in the environment of the sensor arm 24. Alternatively the enclosure 34 and clamps 30 and 32 can be retained for further test measurements in which the strain and temperature are altered and further measurements of the helium-neon and broadband interferograms made by scanning the air gap 114 as previously described. Measurements of the temperature and strain in the environment of the sensor arm 24 are made by measuring the helium-neon and broadband interferograms with the clamps 30 and 32 and enclosure 34 removed, and the air gap 114 scanned as previously described for each measurement of the interferograms.

A theoretical analysis of the derivation of strain and temperature experienced by the sensor arm 24 from an output broadband interferogram will now be given. The intensity of the interferometric signal that results on recombination of the light beams from the sensor arm 24 and reference arm 28 is dependent on the complex degree of coherence. For light of frequency $v$ this can be expressed as $\gamma_{12}(P)$ where:

$$\gamma_{12}(P) = \int_{-\infty}^{\infty} \hat{G}(v) \exp(-i\phi(v;P)) dv, \quad (1)$$

where $\hat{G}(v)$ is the normalised spectral density of the light and $\phi(v;P)$ is the resultant phase difference between the two beams on recombination. The set P includes all physical parameters that may affect the optical pathlengths in the two arms. These parameters may cause dispersive changes, i.e the derivative with respect to optical frequency $v$, of the phase change caused by the parameters is a function of $v$. The parameters may also represent non-dispersive changes such as a vacuum-path delay or delay due to a short air-path.

The translation stage 66 moves across a variable air path $\Delta L$ between positions 74 and 76 and causes a non-dispersive temporal delay $\tau$ where $\tau = \Delta L/c$ (c being the velocity of light in the air path). If this variable delay is scanned through a known range and over a period in which all the other elements in P remain constant, then the intensity of the interferogram of the recombined beams at the detector 124 is given by $$I(Q;\tau) = I_0(1 + \Re\{\gamma 12(Q;\tau)\}) \quad (2)$$

In Equation (2), Q is the subset of P in which all elements other than $\tau$ remain constant, $I_0$ is the total intensity of light in the interferometer and $\Re$ specifies the real part of the complex function $\gamma_{12}(Q;\tau)$. It is assumed that there is an equal split of the input light into each of the arms 24 and 28 for all optical frequencies $v$. With this temporal component $\tau$ specified Equation (1) can be rewritten as the inverse Fourier Transform (FT) of the product $\hat{G}(v)\exp(-i\phi(v;Q))$:

$$\gamma_{12}(Q;\tau) = \int_{-\infty}^{\infty} \hat{G}(v)\exp(-i\phi(v;Q))\exp(-i2\pi v\tau) dv \quad (3)$$

where $\phi(v;Q)$ is the phase of the FT of $\gamma_{12}(Q;\tau)$ and hence of the FT of $I(Q;\tau)$ at frequencies for which $\hat{G}(v)>0$.

The influence of temperature and strain on the passage of light through a section of the sensor arm 24 is now considered. The set Q is subdivided into two sets, S and R. The set S contains the elements of Q which directly influence the optical path length of a section of the sensor arm 24, which is termed the sensing length. The elements of Q that affect the optical path in the entire reference section and sensing section between directional couplers 18 and 96 is contained in R. For calibration of the interferometer all the elements of R must be fixed. If in an initial state of the interferometer there is defined an initial strain $\epsilon_{init}$ and temperature $T_{init}$ of the sensing length with initial length $L_{init}$ which form elements of S. From this initial state there is associated an initial reference interferogram due to an initial phase difference $\phi(v;S_{init},R)$. If the strain and temperature applied to the sensing length deviate from their initial values by $\epsilon$ and T respectively then a change in the phase relationship results. There are two phase contributions $\phi(v;\epsilon,R)$ and $\phi(v;T,R)$ as well as a cross-sensitivity term which, for small changes in temperature and strain, may be ignored. The resultant phase relationship is then denoted by $\phi(v;\epsilon,T,R)$, where $$\phi(v;\epsilon,T,R) = \phi(v;S_{init},R) + \phi(v;\epsilon R) + \phi(v;T,R) \quad (4)$$

To a good approximation, for small changes in strain and temperature the last two terms in the above phase relationship may be expressed explicitly in terms of the products of strain and temperature and their respective dispersive propagation constants denoted by $\beta_\epsilon(v)$ and $\beta_T(v)$. As $S_{init}$ and R represent fixed parameters they can be dropped from the notation and the phase relation can then be written:

$$\phi(v) = \phi_{init}(v) + L_{init}\epsilon\beta_\epsilon(v) + L_{init}T\beta_T(v) \quad (5)$$

where $\phi_{init}(v)$ is the phase relation in the initial state.

In a region around some reference frequency $v_{ref}$, $\phi(v)$ may be represented as a Taylor series expressed in the compact form $$\phi(v) = \phi \cdot v \quad (6)$$

Here, $\phi = \{\phi_0, \phi_1, \phi_2, \ldots\}$, the ith element $\phi_i$ being given by the ith derivative of $\phi(v)$ with respect to $v$ evaluated at $v_{ref}$ and where the ith element of $v$ is given by $v_i = (1/i!)(v - v_{ref})^i$.

The first and second order derivatives of $\phi(v)$ represent the group delay and optical dispersion respectively. Expressing $\phi_1$ and $\phi_2$, the first and second order derivatives of $\phi(v)$ as $\phi'$ and $\phi''$ respectively, then the first and second order phase coefficients are related to strain and temperature by $$\begin{bmatrix} \phi' - \phi'_{init} \\ \phi'' - \phi''_{init} \end{bmatrix} = L_{init} \begin{bmatrix} \beta'_\epsilon & \beta'_T \\ \beta''_\epsilon & \beta''_T \end{bmatrix} \begin{bmatrix} \epsilon \\ T \end{bmatrix} \quad (7)$$

or more conveniently as $$D = L_{init} \beta \cdot M \quad (8)$$

Once $\beta$ is found experimentally, by independently applying known values of $\epsilon$ and T with respect to the reference values of $\epsilon_{init}$ and $T_{init}$, values of strain and temperature may be found using the inverse relationship to (8):

$$M = \frac{1}{L_{init}} \beta^{-1} \cdot D \quad (9)$$

In order that the numerical matrix inversion of $\beta$ be meaningful, the estimated fractional error in the determinant of $\beta$ must be small. This has been demonstrated in experimental measurements using the apparatus described in this embodiment.

The system generates a broadband interferogram and a helium-neon interferogram in an initial state in which the strain and temperature are known, either by direct measurement using calibration equipment or from previous measurements of the system. Broadband and helium-neon interferograms are then generated which correspond to an unknown strain/temperature and in this unknown state the stain and/or temperature on the sensor arm 24 differ from the initial state. The helium-neon interferogram for each state is used to correct the corresponding broadband interferogram to take account of any variation in scanning length. A Fast Fourier Transform of the corrected broadband interferogram produces a value for the phase of the broadband interferogram. A least squares polynomial fit to the 3rd order of the phase of the broadband inteferogram in both the initial state and the measured state produces four coefficients of the phase for each interferogram. The first and second order phase coefficients correspond to the group delay and optical dispersion respectively. By comparing the differences in the group delay and the optical dispersion between the initial and measured states, unique values for the differences in temperature and strain between the two states are obtained. In consequence the contributions of strain and temperature are deconvoluted.

Figure 4:
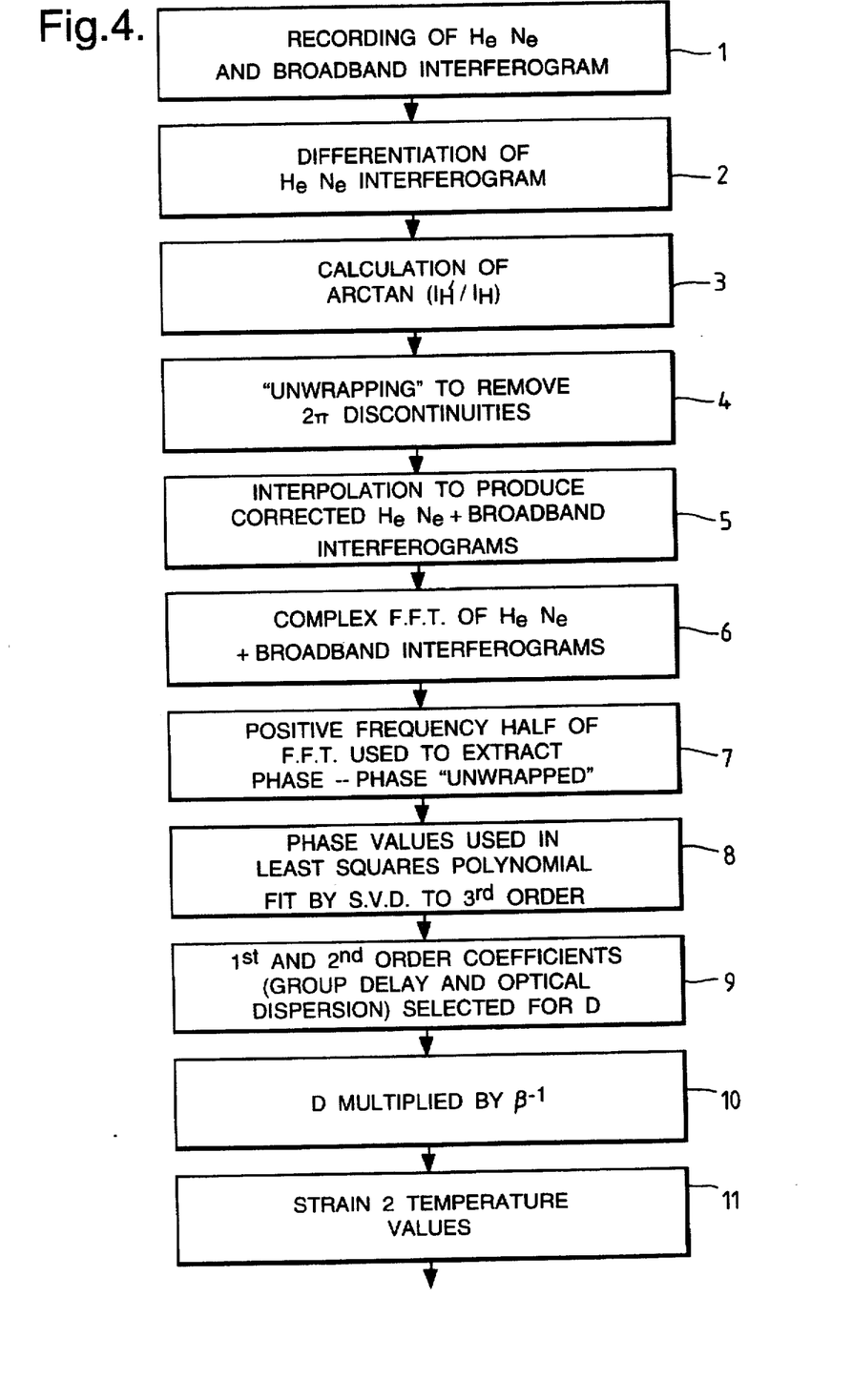
FIG. 4 is a flowchart of the software signal processing steps for determining strain and temperature from the output of the device of FIG. 1.

Referring to FIG. 4, there is shown a flowchart of the software used in the extraction of strain and temperature experienced by the sensor arm 24 from a broadband interferogram. The software takes as inputs the broadband interferogram and helium-neon interferogram and from these calculates the first and second order derivatives $\phi'$, $\phi''$ in Equation 7.

The value of $L_{init}$, $\beta'_\epsilon, \beta''_\epsilon$, $\beta'_T, \beta''_T$, $\phi'_{init}$ and $\phi''_{init}$ in equation 7 are already known by measurement and calibration. When the values $\phi'$, and $\phi''$ have been calculated the software can then calculate the values of strain and temperature using Equation 9.

Box 1 in FIG. 4 shows the helium-neon interferogram and the broadband interferogram as data inputs to the software. Boxes 2 to 5 denote an operation on the interferograms to remove drift, that is, the calculation and removal of the amount by which path length modulation in the interferometer deviates from uniform translation of the translation stage 66. This process is an interpolation of the helium-neon and broadband interferograms so that intervals between intensity values represent equal changes in group delay $\tau$. The helium-neon interferogram is differentiated (Box 2) and a comparison made with the original helium-neon interferogram (Box 3). From this comparison an estimate of the induced phase is made. The induced phase change can cause the phase to have a value in the region $-\pi$ to $+\pi$. Multiples of $2\pi$ are added to values of phase so as to remove phase differences of magnitude greater than $\pi$ between successive phase values. The removal of such discontinuities is well known in signal processing, and is termed "unwrapping". Unwrapping is described in "Holographicand Speckle Interferometry" by R Jones and C Wykes (Cambridge University, Press, London 1983). The use of the helium-neon interferogram thus enables the mean frequency to be calculated, and intervals in $\tau$ to be generated. The removal of drift results in "corrected" helium-neon and broadband interferograms (Box 5). The corrected interferograms are in a form in which they can be used as data inputs to a complex Fast Fourier Transform (FFT) routine (Box 6). The phase of the positive frequency component of the FFT of the broadband interferogram is then calculated (Box 7). A least squares polynomial fit to the phase is then made using singular value decomposition (SVD) to the third order. The software calculates the Taylor coefficients of $\phi'$ and $\phi''$ (the first and second order coefficients) for the broadband interferogram phase. The Taylor coefficients for the initial state $\phi'_{init}$ and $\phi''_{init}$ are then subtracted from the Taylor coefficients $\phi'$ and $\phi''$ for the broadband interferogram, as on the left-hand side of Equation 7.

Figure 5:
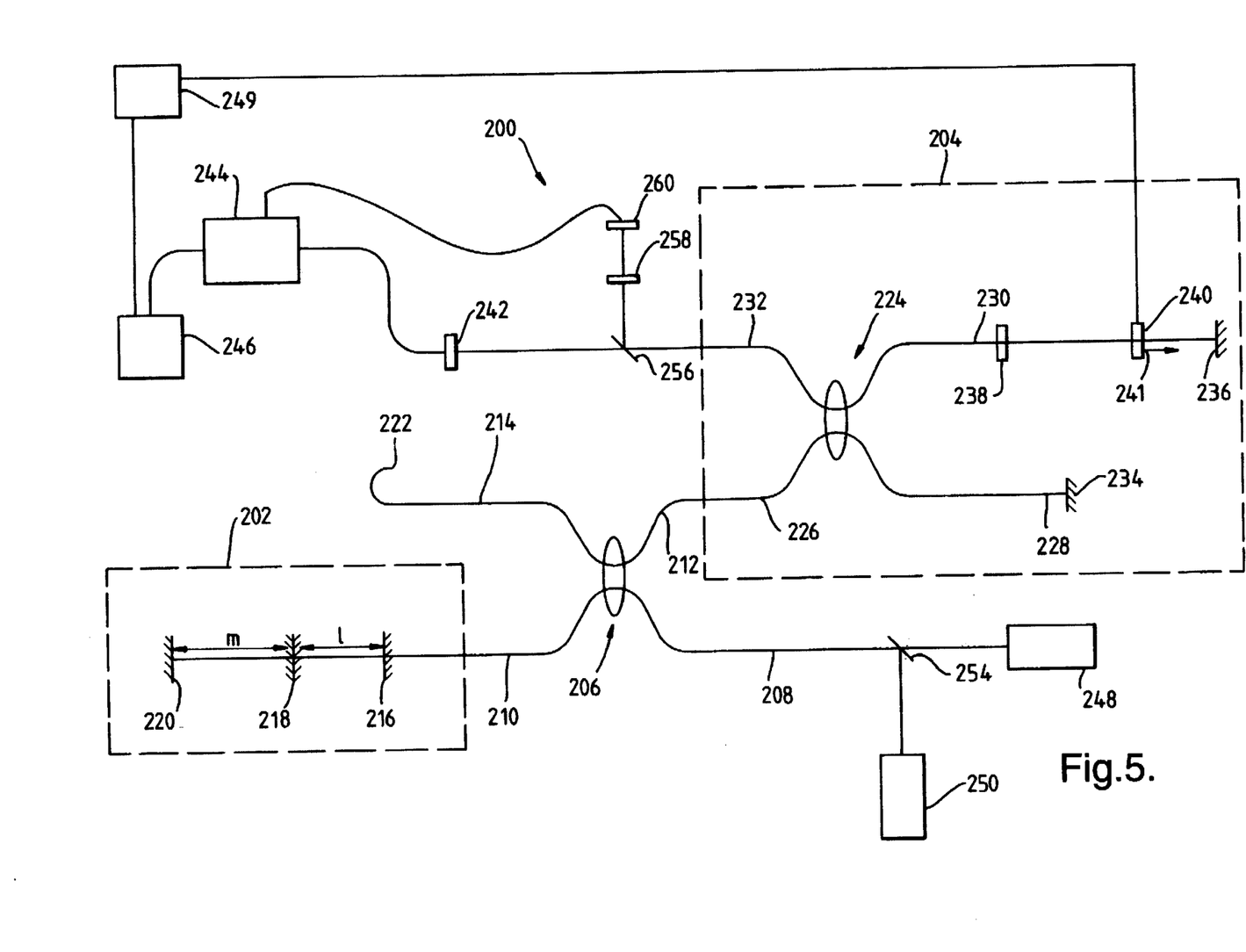
FIG. 5 is a schematic view of a tandem interferometry device of the invention.

Referring to FIG. 5, there is shown a further embodiment of the invention in the form of a tandem interferometer, indicated generally by 200. The tandem interferometer 200 includes a sensing interferometer 202 and a reference interferometer 204. The reference interferometer 204 is in a thermally isolated enclosure (not shown).

A directional coupler 206 which has an input arm 208, a sensing arm 210, an output arm 212, and a terminated arm 214. All arms 208 to 214 are formed of optical fibre. The sensing interferometer 202 is located at one end of the sensing arm 210 and has an input mirror 216, a first sensing mirror 218 and a second sensing mirror 220. The input mirror 216 and first sensing mirror 218 are arranged to reflect substantially 50% of incident light and transmit the remainder. The mirrors 216 and 218 are formed by cleaving the fibre of the sensing arm 210, applying a reflective coating to one face of the fibre optic, and rejoining the fibres. The mirror 220 is fully reflecting. The separation between mirrors 216 and 218 is signified by 1, and the separation between mirrors 218 and 220 by m, where m is greater than 1.

The terminated arm 214 is formed by bending an end 222 around a mandrel (not shown) to create a high bend loss.

The reference interferometer 204 includes a directional coupler 224 which has an input arm 226, a reflection arm 228, a scanning arm 230 and an output arm 232. Arms 226 to 232 are formed of optical fibres. The input arm 226 is an extension of the output arm 212 of directional coupler 206. The reflection arm 228 is terminated by a mirror 234. The scanning arm 230 is also terminated by a mirror 236. Scanning arm 230 is secured at two points on its length by clamps 238 and 240. Clamp 240 has a translation stage 241 allowing stretching of the scanning arm 230. A detector 242 is located at one end of the output arm 232.

An oscilloscope 244 is connected to the detector 242. The oscilloscope 244 is connected to a computer 246 capable of processing signals received from the detector 242. The computer 246 also controls the translation stage 241 of the clamp 240, via a motor controller 249.

Two light sources 248 and 250 are arranged to inject light into the input arm 208. Source 248 is a broadband source, and source 250 emits light in a narrow bandwidth. Light from sources 248 and 250 enters arm 208 via beamsplitter 254. A second beamsplitter 256 is used in output arm 232 to demultiplex the light from sources 248 and 250. A narrow-band filter 258 ensures that light from broadband source 248 does not enter a narrowband detector 260. Detector 260 is connected to the oscilloscope 244.

The operation of the tandem interferometer device 200 will now be described. The broadband and narrowband sources 248 and 250 perform the same functions as the corresponding sources in the previous embodiment. Light from the sources passes to the sensing arm 210 and is reflected and transmitted through both mirrors 216 and 218, and reflected from mirror 220. As the light propagates in the fibre between mirrors 216 and 218, and between mirrors 218 and 220, the strain and temperature changes on the respective lengths of fibre causes changes in group delay and optical dispersion of the light. Light reflected back along sensing arm 210 from mirror 218 travels a distance 2l further than light reflected from mirror 216. Also light reflected from mirror 220 travels 2 m further than light reflected from mirror 218. Light is propagated back towards coupler 206, where a part of the light propagates along arm 212 to the arm 226 of the reference interferometer 204. Part of the light propagating in arm 226 is coupled into arm 228 and part to arm 230.

A section of arm 230 of length 1-δ between clamps 238 and 240 is stretched to length m+δ by the translation of clamp 240. Here, δ is an arbitrary length which is greater than the coherence length of the source 248. During stretching the reflection of light from mirror 236 causes the stretched length to be scanned. When the scanned length in the reference interferometer 204 is equal to the scanned length in the sensing interferometer 202 an interferogram is generated at detectors 242 and 260. Thus an interferogram is generated whenever the scanned length causes a path length imbalance in the reference interferometer 204 equal to 2l or 2 m. In any scan there will thus be two such interferograms generated. The interferograms may be analysed in the same manner as for the previous embodiment.

In an alternative embodiment the stretching of the fibre arm 230 can be replaced by a scanned air gap. In a further embodiment there may be one input mirror and one sensing mirror, forming just one sensing element. In a yet further embodiment there may be a larger number of mirrors attached to fibre arm 210, enabling a larger number of interferograms to be generated. Each length of fibre between mirrors will then form a sensing element. There may then be a number of sensing elements on each sensing interferometer 202. This would enables the sensing interferometer 202 to be used for making a number of simultaneous measurements at different locations. For example, the elements may be located at different points in an aircraft airframe structure. Alternatively, each sensing element may be connected to a separate reference interferometer. The sensing elements may also be detachable from the reference interferometer 204, so that the same reference interferometer 204 and analysis equipment such as detectors 242 and 260, and oscilloscope 244 and computer 246, can be used on sensing elements in another structure.

We claim:

1. A sensor system incorporating an interferometer device incorporating:
   (a) a reference arm,
   (b) a sensor arm having optical group delay and optical dispersion responsive to temperature and strain therein,
   (c) a source of broadband radiation,
   (d) means for coupling radiation from the source to each of the interferometer arms,
   (e) delaying means arranged to introduce a variable temporal delay in the path of radiation in one of the interferometer arms relative to any temporal delay in the path of radiation in the other arm,
   (f) combining means arranged to receive radiation contributions from the interferometer arms and to combine them to produce a radiation interferogram,
   (g) detecting means for detecting the interferogram, and
   (h) processing means for processing interferogram information: wherein,
   (i) the combining means is arranged to produce a broadband radiation interferogram,
   (j) the detecting means is arranged to detect the broadband interferogram variation as a function of varying temporal delay, and
   (k) the processing means includes means for extracting the optical group delay and optical dispersion from the interferogram variation and deriving therefrom at least one of the temperature and strain associated with the sensor arm.

2. A sensor system as claimed in claim 1 characterised in that the interferometer arms are disposed in a Mach Zehnder configuration.

3. A sensor system as claimed in claim 2 wherein the interferogram is a first interferogram, characterised in that the system is also arranged to generate a second interferogram from narrowband radiation for the purposes of calibration of the interferometer.

4. A sensor system as claimed in claim 3 characterised in that the broadband radiation and the narrowband radiation from which the first and second interferograms are produced are arranged to propagate in mutually opposite directions in the interferometer arms.

5. A sensor system as claimed in claim 1 characterised in that the interferometer device comprises first and second interferometers, said first interferometer includes the sensor arm and has an output connected to an input of the second interferometer, the second interferometer includes the reference arm and a reflection arm, the delaying means is incorporated in one arm of the second interferometer and provides a variable temporal delay enabling an optical path difference in the sensor arm to be balanced by an optical path difference between the reference and reflection arms, and the combining means combines radiation contributions from the arms of the second interferometer to produce a radiation interferogram.

6. A sensor system as claimed in claim 5 characterised in that the sensor arm incorporates a length of optical fibre including a partially reflecting mirror and being arranged to direct light input to the sensor arm and transmitted by the partially reflecting mirror to a retro-reflecting mirror arranged to receive light output from the fibre and to return it thereto.

7. A sensor system as claimed in claim 6 characterised in that the sensor arm incorporates a second partially reflecting mirror disposed between the aforesaid partially reflecting mirror and the retro-reflecting mirror and arranged to define two interferometer path lengths (l, m).

8. A sensor system as claimed in claim 6 characterised in that the sensor arm includes mirrors comprise reflective coatings applied to cleavages of the sensor arm optical fibre.

9. A sensor system as claimed in claim 7 characterised in that the system is arranged to combine light from each of the interferometer path lengths (l, m) during propagation of radiation towards the second interferometer.

10. A sensor system as claimed in claim 7 characterised in that it includes a plurality of second interferometers, and each second interferometer is arranged to receive light from a respective one of the interferometer path lengths (l, m).

11. A sensor system as claimed in claim 1 characterised in that the system includes calibrating means for calibrating the system in terms of known values of strain and temperature associated with the sensor arm.

12. A sensor system incorporating an interferometer device incorporating:
(a) a reference arm,
(b) a sensor arm having optical group delay and optical dispersion responsive to temperature and strain therein,
(c) a source of broadband radiation,
(d) means for coupling radiation from the source to each of the interferometer arms,
(e) delaying means arranged to introduce a variable temporal delay in the path of radiation in one of the interferometer arms relative to any temporal delay in the path of radiation in the other arm,
(f) combining means arranged to receive radiation contributions from the interferometer arms and to combine them to produce a radiation interferogram,
(g) detecting means for detecting the interferogram, and
(h) processing means for processing interferogram information wherein,
(i) the combining means is arranged to produce a broadband radiation interferogram.
(j) the detecting means is arranged to detect the broadband interferogram variation as a function of varying temporal delay, and
(k) the processing means includes means for extracting the optical group delay and optical dispersion from the interferogram variation and deriving therefrom at least one of the temperature and strain associated with the sensor arm wherein the system includes calibrating means for calibrating the system in terms of known values of strain and temperature associated with the sensor arm, wherein the calibrating means includes a thermally insulated enclosure within which the sensor arm is located and thermocouples arranged for measurement of sensor arm temperature.

13. A sensor system incorporating an interferometer device incorporating:
(a) a reference arm,
(b) a sensor arm having optical group delay and optical dispersion responsive to temperature and strain therein,
(c) a source of broadband radiation,
(d) means for coupling radiation from the source to each of the interferometer arms
(e) delaying means arranged to introduce a variable temporal delay in the path of radiation in one of the interferometer arms relative to any temporal delay in the path of radiation in the other arm.
(f) combining means arranged to receive radiation contributions from the interferometer arms and to combine them to produce a radiation interferogram,
(g) detecting means for detecting the interferogram, and
(h) processing means for processing interferogram information wherein,
(i) the combining means is arranged to produce a broadband radiation interferogram,
(j) the detecting means is arranged to detect the broadband interferogram variation as a function of varying temporal delay, and
(k) the processing means includes means for extracting the optical group delay and optical dispersion from the interferogram variation and deriving therefrom at least one of the temperature and strain associated with the sensor arm, wherein the system includes calibrating means for calibrating the system in terms of known values of strain and temperature associated with the sensor arm, wherein the calibrating means includes clamps for clamping the sensor arm, one of the clamps being moveable relative to the other in order to impose predetermined strain on the sensor arm.

14. A sensor system as claimed in claim 1 characterised in that the reference arm includes means for controlling the polarisation of radiation to improve interferogram fringe visibility.

15. A sensor system as claimed in claim 14 characterised in that the means for controlling the polarisation of radiation comprises two fibre-optic loops each arranged to have characteristics similar to a quarter-wave plate.

16. A sensor system as claimed in claim 1 characterised in that the sensor arm is mounted in a gas turbine engine and arranged for measurements of strain and temperature within the engine.

17. A sensor system as claimed in claim 1 characterised in that the sensor arm is mounted in an aircraft airframe or aerosol structure and arranged for measurements of strain and temperature on the structure.

18. A sensor system as claimed in claim 1 characterised in that the sensor arm is located in carbon fibre material and arranged for measurements of strain and temperature on the material.

19. A sensor system as claimed in claim 1 characterised in that the delaying means comprises a translation stage arranged to vary the length of an air gap in the reference arm.

20. A sensor system as claimed in claim 1 characterised in that the delaying means is a movable clamp arranged to provide stretching of the reference arm.

21. A sensor system as claimed in claim 1 characterised in that the processing means is arranged to remove $2\pi$ discontinuities from interferograms.

22. A sensor system as claimed in claim 7 characterized in that the sensor arm incorporates a plurality of partially reflecting mirrors disposed along its length to define a plurality of interferometer path lengths (l, m).

23. A sensor system incorporating an interferometer device incorporating:

(a) a reference arm and a sensor arm arranged to receive radiation from a broadband source, (b) delaying means arranged to introduce a variable temporal delay in the path of radiation in one of the interferometer arms relative to the path in the other arm, (c) combining means arranged to receive radiation contributions from the interferometer arms and to combine them to produce a broadband radiation interferogram, (d) processing means to process interferogram information, and (e) calibrating means, wherein (f) the processing means is arranged to extract optical group delay and optical dispersion from the interferograms and to derive therefrom at least one of temperature and strain associated with the sensor arm and (g) the calibrating means includes a thermally insulated enclosure within which the sensor arm is located and thermocouples arranged for measurement of sensor arm temperature and it is arranged to calibrate the system in terms of known values of strain and temperature associated with the sensor arm.

24. A sensor system as claimed in claim 23 wherein the calibrating means includes clamps for clamping the sensor arm, one of the clamps being moveable relative to the other in order to impose a predetermined strain on the sensor arm.

* * * * *

UNITED STATES PATENT AND TRADEMARK OFFICE
CERTIFICATE OF CORRECTION

PATENT NO.    : 5,721,615
DATED         : February 24, 1998
INVENTOR(S)   : McBRIDE et al.

It is certified that error appears in the above-identified patent and that said letters patent is hereby corrected as shown below:

Column 3, line 63, "$27\pi$" should read --$2\pi$--.

Column 5, line 60, "Art" should read --An--.

Column 9, line 15, "$+\phi(v;\varepsilon R)$" should read --$+\phi(v;\varepsilon,R)$--.

Column 10, line 3, "stain" should read --strain--.

Column 10, line 49, "Holographicand" should read --Holographic and--.

Signed and Sealed this

Nineteenth Day of May, 1998

Attest:

BRUCE LEHMAN

Attesting Officer    Commissioner of Patents and Trademarks